3,555,823
SOLID PROPELLANT ELECTRIC ROCKET
William J. Guman, Commack, N.Y., assignor to Fairchild Hiller Corporation, Hagerstown, Md., a corporation of Maryland
Filed Nov. 17, 1967, Ser. No. 683,888
Int. Cl. H05h 1/00
U.S. Cl. 60—202
10 Claims

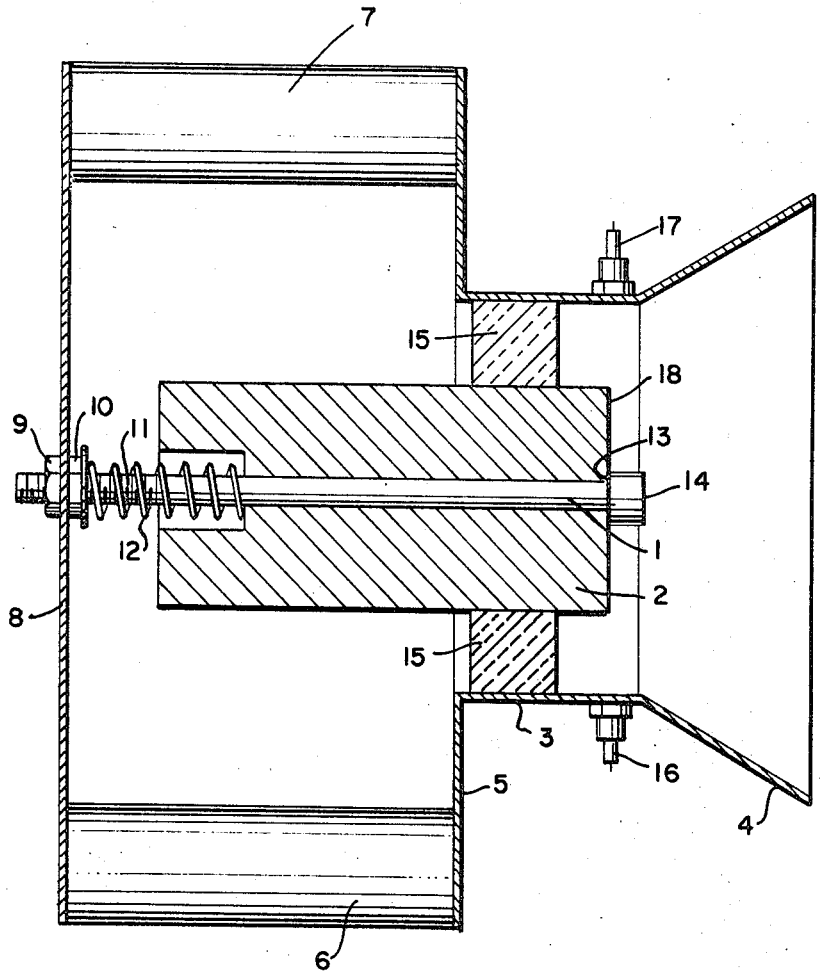

ABSTRACT OF THE DISCLOSURE

An electric rocket for space applications in which a solid fluorocarbon propellant is depolymerized, converted into a plasma and magneto-hydrodynamically accelerated by an electric discharge.

---

This invention relates to electric rockets of the type wherein thrust is produced by the magnetohydrodynamic and gasdynamic acceleration of a plasma. More particularly, this invention relates to an electric rocket wherein the plasma is derived from a solid propellant body by means of an electric discharge.

It has long been recognized that solid propellant rockets present certain inherent advantages over liquid propellant rockets. Solid propellants are, in general, self-supporting and, consequently, do not require separate fuel tanks, pumps, pressurization, temperature control or ullage motors, etc. In fact, in some solid propellant rockets, the solid fuel is simply consumed in situ, so that no fuel feeding apparatus is required.

On the other hand, many solid propellant materials suitable for use in electric rockets are not entirely compatible with the cryogenic temperatures and high vacuum of a deep space environment. For example, many materials will sublime or "out gas" when subjected to a high vacuum. Because of the resulting loss of mass, such materials can not be economically stored for long periods in a deep space environment. Further, many solid propellant materials tend to form carbon deposits (char) or other deposits as they are consumed. Such deposits may degrade the performance of the rocket and may, in some instances, cause a complete failure of operation.

It is, therefore, an object of this invention to provide an improved solid propellant for electric rockets.

It is also an object of this invention to provide an improved electric rocket having a solid propellant which is compatible with a deep space environment and yet may be readily converted into a plasma by means of an electric discharge.

It is also an object of this invention to provide an improved electric rocket having a solid propellant which forms a minimum of deposits as it is consumed.

It is another object of this invention to provide an improved solid propellant electric rocket having a simple, but effective propellant feeding mechanism.

According to the above and other objects, the present invention provides a pulsed plasma solid propellant electric rocket including a pair of electrodes, an energy source for supplying pulses of electrical energy to the electrodes, and a solid body of polymerized fluorocarbon propellant disposed in operative relation between the electrodes. Each pulse of electrical energy applied to the electrodes serves to depolymerize the solid fluorocarbon propellant and converts the resulting vapor into a plasma which is accelerated by a combination of gasdynamic and magnetohydrodynamic forces in order to provide thrust. If a high total impulse is required, a simple spring-feed mechanism may be employed to continuously urge the operative surface of the fluorocarbon propellant against a simple stop located near the throat of the rocket nozzle. One or more surface igniter plugs may be used to provide the necessary ions to initiate the electrical discharge in the vacuum between the two electrodes.

An advantage of the solid propellant electric rocket of the present invention is that it is simple and rugged in construction and extremely reliable in operation.

Other objects and advantages of the present solid propellant electric rocket will be apparent to those skilled in the art from the following detailed description and accompanying drawing which sets forth the principle of the invention and, by way of example, the preferred embodiment for carrying out that principle.

Before taking up the detailed description of the preferred embodiment of the present invention, it will be helpful to discuss the mechanisms which produce the acceleration of the plasma. As presently understood, the mechanisms which produce the plasma acceleration are:
(a) The magnetic pressure force generated by interaction of the radial component of the electric current with the self-induced azimuth magnetic field (MHD thrust).
(b) The magnetic pressure generated by the interaction of the axial component of the electric current with the self-induced azimuthal field. (c) The gas-dynamic pressure force.

In pulsed plasma electric rockets in which the discharge energies are small (on the order of several joules), the gas-dynamic pressure force may be as important as the magnetic driving forces. The general expression for the average thrust T of a coaxial electrode device due to the magnetic pressure force $j_r \times B$ is:

$$T = f \left( \frac{\mu}{4\pi} \ln \frac{r_o}{r_i} \right) \int_0^t i^2(t) dt$$

where $f$ is the pulse frequency, $\mu$ is the magnetic permeability, $r_o$ and $r_i$ the radius of the outer and inner electrodes respectively, and $i$ is the instantaneous value of the time-varying current. Assuming slug-type acceleration simplifies evaluation of the integral for a series LCR discharge network. For a critically damped discharge the specific thrust is given by:

$$\frac{T}{P} = \frac{\mu}{8\pi} \sqrt{\frac{C}{L}} \ln \frac{r_o}{r_i} [1 - (1 + 2n - 2n^2)e^{-2n}] \text{ (Newtons/watt)}$$

where P is the power $$\left( f \frac{1}{2} CV^2 \right)$$

delivered to the capacitor to generate thrust T and the parameter $n \equiv t/\sqrt{LC}$. The specific impulse $I_{sp}$ is given by:

$$I_{sp} = \frac{E}{M} \frac{\mu}{8\pi g} \frac{1}{\sqrt{L/C}} \ln \frac{r_o}{r_i} [1 - (1 + 2n - 2n^2)e^{-2n}]$$

where $$E = \frac{1}{2} CV^2$$

is the initial energy in the capacitor. The thrust efficiency $\eta_T$ is given by:

$$\eta_T = \frac{T^2}{2\dot{m}P}$$

$$= \frac{1}{2} \left( \frac{\mu}{8\pi} \right)^2 \frac{1}{L/C} \left( \ln \frac{r_o}{r_i} \right)^2 \frac{E}{m} [1 - (1 + 2n - 2n^2)e^{-2n}]^2$$

Subject to the assumptions invoked the performance parameters of the pulsed plasma electric rocket due to MHD effects should vary in the following manner:

$$\text{Specific thrust} \frac{T}{P} \alpha \frac{1}{\sqrt{E/m}}$$

$$\text{Specific impulse } I_{sp} \alpha \frac{E}{m} \frac{1}{\sqrt{L/C}}$$

$$\text{Thrust efficiency } \eta_T \alpha \frac{E}{m} \frac{1}{\sqrt{L/C}}$$

It is noted that each of these performance parameters varies inversely with the square root of the ratio of inductance to capacitance. This factor is directly proportional to the critical resistance of the circuit, and, hence, the performance parameters of the electric rocket should be enhanced by reducing the critical resistance. This result indicates that efforts should be made to provide electric rockets with good electrical circuit design. In addition, it is noted that both the specific impulse and the thrust efficiency vary directly with the initial energy per unit mass accelerated. This result is significant and will be discussed in greater detail hereinafter.

A complete analysis of the thrust contributed by gas-dynamic pressure forces is considerably more difficult to formulate than that of the thrust contributed by MHD effects. However, the results of a simplified analysis are as follows:

$$\text{Specific thrust} \frac{T}{P} \alpha \frac{1}{\sqrt{E/m}}$$

$$\text{Specific impulse } I_{sp} \alpha \sqrt{E/m}$$

The thrust efficiency $T_2 2\dot{m}P$ was found to be a function of the fluid only. It is noted that the energy per unit mass is again the significant factor governing the performance parameters. Since the specific thrust due to gas-dynamic pressure forces varies inversely with the square root of energy per unit mass, any increase in the energy per unit mass affects specific impulse and thrust efficiency due to MHD action in a favorable manner faster than it affects the specific thrust in an unfavorable manner. This trade-off between specific impulse and specific thrust has been observed in the laboratory.

From the foregoing, it appears that the performance of the present pulsed plasma solid propellant electric rocket can be imroved by increasing the energy per unit mass of propellant expelled during each discharge. This may be accomplished in two ways. The energy relased per discharge can be increased while holding the mass of propellant expelled constant. An alternate approach is to reduce the propellant mass being energized by a given quantity of energy. In the limiting case no propellant is provided and only sputtered metallic electrode mass is accelerated. This latter approach can provide an extremely high specific impulse (in excess of 6300 seconds) and a high thrust efficiency (in excess of 50%) but at the expense of specific thrust (considerably less than 1 micropound per watt). The result is that, for a mission requirement of a certain total impulse, the overall weight of the rocket including propellant and energy storage devices will be excessive. Minimum rocket weight for a given practical mission requirement will generally be obtained at somewhat lower levels of specific impulse.

The drawing shows a cross-sectional view of one form of solid propellant electric rocket according to the present invention. The basic elements of the rocket are arranged in a coaxial configuration. Center electrode 1 is surrounded by a cylindrical body 2 of solid polymerized fluorocarbon propellant which is in turn surrounded by a cylindrical outer electrode 3 which also serves as the rocket nozzle. In order to improve nozzle performance, outer electrode 3 may be flared outward to form an expansion cone 4 as shown in the drawing.

The center electrode 1 is essentially an electrical conductor with good refractory properties because of the operating temperatures encountered. For example, a molybdenum center electrode has been successfully used in the solid propellant electric rocket of the present invention. The cylindrical outer electrode is not subjected to temperatures as high as those encountered at the center electrode 1. Therefore, cylindrical outer electrode 3 may be made of a conductive material such as aluminum or preferably stainless steel in order to reduce wear over long periods of operation.

At the end of cylindrical outer electrode 3 opposite from expansion cone 4, there is provided a radially extending flange 5 on which are mounted a pair of capacitors 6 and 7 which store the electrical energy used to provide an electrical discharge between center electrode 1 and cylindrical outer electrode 3. If desired, flange 5 may be made of electrically conductive material in order to provide an electrical current path between the collector plates of capacitors 6 and 7 and cylindrical outer electrode 3 of the rocket assembly. The other ends of capacitors 6 and 7 are mounted on a support member 8 which may also be made of an electrically conductive material in order to provide an electrical current path between the center electrode 1 and the remaining collector plates of capacitors 6 and 7.

As shown in the drawing, center electrode 1 is mounted on support member 8 by means of a pair of nuts 9 and 10 which engage screw threads 11 formed on electrode 1. A compressed high-temperature helical spring 12 surrounding center electrode 1 butts nut 10 and urges propellant body 2 against the shoulder 13 of the enlarged portion 14 formed at the operative end of center electrode 1. Mounted on the interior surface of cylindrical outer electrode 3 is an annular body 15 of electrically and thermally insulative material which acts as a heat shield and also helps to keep propellant body 2 properly centered. A pair of surface igniter plugs suitably mounted with their operative ends projecting through the inner surface of cylindrical outer electrode 3 to provide a source of ions for initiating the electrical discharge between outer electrode 3 and center electrode 1, as will be explained in greater detail hereinafter.

A suitable solid polymerized fluorocarbon material for use as the propellant of the pulsed plasma electric rocket of the present invention is commercially available under the trade name "Teflon" which is a fluorinated ethylene-propylene resin produced by the E. I. du Pont de Nemours Co., of Wilmington, Del. This material is completely compatible with a deep-space environment. It is stable, inert and nonreactive and does not sublime or outgas when subjected to cryogenic temperatures and a hard vacuum. Hence, the solid polymerized fluorocarbon propellant used in the subject electric rocket does not require fuel tanks or other protective equipment for storage in a deep-space environment.

Although the polymerized fluorocarbon propellant is stable in a hard vacuum at cryogenic temperatures, it may readily be depolymerized and thus converted directly from the solid to the gaseous state by the application of a relatively small amount of energy. According to the present invention, the required energy is provided in the form of an electrical discharge which also serves to convert the resulting gas into a plasma which is then accelerated by a combination of magnetohydrodynamic and gas-dynamic effects to produce thrust. Because the solid fluorocarbon is an excellent electric and thermal insulator, the layer of material removed by the electric discharge is typically on the order of angstrom units thick. The depolymerization process stops immediately when energy ceases to be applied. Further, the depolymerization process produces no char (carbon deposits) or other deposits which might tend to degrade the performance of the rocket after long periods of operation. In fact, the mass removal process is a self-cleaning action which tends to assure uniform performance over the entire life of the propellant supply. It is also noted that, while micrometeorite impacts upon the propellant body may have some temporary effect upon the performance of the rocket, such impacts will not cause a complete failure of operation.

During the operation of the present solid propellant electric rocket, the entire front face 18 of the propellant body 2 which directly faces the vacuum of space is uniformly depolymerized including the very narrow portion in contact with the shoulder 13 of the enlarged end 14 of the center electrode 1. As the propellant is consumed, the compressed spring 12 automatically feeds the remaining propellant at the correct rate simply by continuously urging the front face 18 of propellant body 2 into contact with shoulder 13. This propellant feed system is inherently compatible with zero gravity conditions as well as with accelerations which might be found, for example, in a spinning satellite.

Although a propellant feed system is included in the preferred form of electric rocket shown in the drawing, it will be appreciated by those skilled in the art that the principles of the present invention encompass a solid propellant electric rocket having no propellant feed mechanism. In fact, constant performance with no propellant feed has been experimentally demonstrated in a test involving $1.2 \times 10^6$ discharges for a total impulse of 7.4 lb.-seconds.

Because of its electrically insulative properties, the solid fluorocarbon propellant of the present electric rocket will not carry sufficient current to initiate the electrical discharge between central electrode 1 and cylindrical outer electrode 3. Therefore, surface igniter plugs 16 and 17 similar to those used in jet engines are provided in order to inject particles into the interelectrode spacing to initiate the main thrusting discharge. Such surface igniter plugs derive charged particles from a film of semiconductor material (copper oxide-alumina) located between the coaxial electrodes of the plug. Their operation requires approximately 0.006 to 0.024 joule per discharge which is a rather small amount of energy by comparison with the main thrusting discharge of the electric rocket.

The charged particles produced by the igniter plugs 16 and 17 form a plasma which serves as the initial conductive medium for the main discharge between electrodes 1 and 3. Because of the relative positions of the center electrode 1 and the propellant body 2, the particles of the plasma are initially in immediate contact with the front face 18 of the propellant body. The bombardment by the plasma particles heats the front surface 18 of the solid fluorocarbon propellant until, at a temperature of 510° C.–700° C., the long polymer chains decompose and release the following gaseous products: 94% $C_2F_4$, 2.6% $C_3F_6$, 0.86% $CF_4$ and 0.73% $C_4F_8$. This process is known as depolymerization although it resembles sublimation in that material goes directly from the solid state into the gaseous state. The energy required to convert the fluorocarbon propellant of the present invention from the solid to the gaseous state is approximately $9.9 \times 10^5$ joules/lb. of propellant.

The depolymerization of the fluorocarbon propellant releases a gaseous mass into the discharge region. The discharge current passes through this gaseous mass producing a certain amount of ionization with a resulting increase in the discharge current. The increased current produces ohmic heating of the plasma which raises the gas pressure. This internal gas pressure produces the initial expansion of the gaseous products into the evacuated interelectrode space. As the electric discharge current continues to rise, the self-induced magnetic field interacts with the electrically charged particles of the plasma causing the plasma to separate from the cylindrical outer electrode 3 as soon as the magnetic pressure exceeds the internal gas pressure. With sufficiently large currents, electromagnetic plasma acceleration takes place. Hence, thrust is generated by the magnetic pressure force ($j_r \times B$) as well as by the expulsion of uncharged particles by aerothermodynamic expansion of the heated gas into the vacuum beyond the rocket nozzle.

Although surface igniter plugs 16 and 17 are used to initiate the main thrusting discharge in the solid propellant electric rocket shown in the drawing, it will be appreciated by those skilled in the art that other means for initiating the discharge might be employed within the spirit and scope of the invention. For example, it may be possible to use a source of alpha particles to initiate the discharge. It may also be possible to initiate the discharge by a Paschen breakdown at high pulse repetition rates.

In general, capacitors 6 and 7 should be of a design characterized by high energy storage density and an operational life commensurate with the mission requirements of the particular solid propellant electric rocket. Capacitors of the extended foil type have generally been found to be most suitable in this regard. For example, extended foil capacitors having an energy storage density on the order of 6–10 joules/lb. and operational lives on the order of $10^8$ discharges are commercially available from Maxwell Labs, of San Diego, Calif., and from Sprague Electric Company of North Adams, Mass.

The capacitors 6 and 7 may be charged from any conventional power source. For example, capacitors 6 and 7 may be charged from the fuel cell or solar cells of a space vehicle or satellite. In many cases, power conditioning apparatus will have to be provided in order to step up the voltage of the power source to a level suitable for use in the solid propellant electric rocket of the present invention.

Although capacitors are employed as the energy storage devices in the preferred embodiment of the present solid propellant electric rocket, it will be appreciated by those skilled in the art that other types of energy storage devices such as, for example, magnetic energy storage devices, may be used to advantage within the spirit and scope of the present invention.

It has been found that the impulse per discharge remains essentially constant over the entire operational life of the apparatus. Hence, the average thrust can be varied by an order of magnitude or more simply by varying the pulse frequency. A slight increase in the impulse per discharge is noted at high pulse repetition rate. This is believed to be due to the fact the propellant remains at a higher temperature between discharges and is therefore more readily depolymerized, thus causing a larger proportion of the discharge energy to be translated into thrust. Pulse rates from 1 pulse per second to 40 pulses per second are normal although higher or lower pulse rates may be employed.

The pulse frequency may be conveniently controlled by a timing circuit which controls the energization of the surface igniter plugs 16 and 17. The timing circuit may be of a conventional type. For example, a unijunction transistor may be used as a variable frequency oscillator to establish an operating frequency corresponding to the desired average thrust level. The oscillator circuit may be followed by a monostable transistor flip-flop stage which produces pulses of sufficient width to ensure the successful ignition of the main thrusting discharges. The flip-flop stage may be followed by one or more buffer stages and a driver amplifier stage in order to relieve any loading effect on the previous stages and in order to provide the low impedance driving power required by the surface igniter plugs 16 and 17. If more precise control of the firing frequency is desired, a crystal controlled oscillator or one of the many commercial clock oscillators may be substituted for the unijunction transistor oscillator stage.

As has been previously mentioned, the specific impulse of a particular solid propellant electric rocket depends largely upon the energy per discharge. It is possible to obtain an extremely high specific impulse at the expense of specific thrust by reducing the propellant mass to be accelerated by a given amount of energy. Practical designs will generally represent a compromise between these performance parameters. For example, it can be calculated that for a total impulse requirement of 5000 lbs.-sec. total impulse, an optimum (minimum weight) design for a solid propellant electric rocket according to the present invention would have a specific impulse of 1300 secs. and a specific thrust of 4 micropounds/watt. The energy per discharge would be 25 joules, the impulse per discharge would be 100 micropounds/sec. and the total number of discharges would be $5 \times 10^7$. The total weight of the device would be 13.1 pounds including 3.8 pounds of solid polymerized fluorocarbon propellant in the form of a rod an inch or so in diameter. The power requirements of the capacitor charging circuit would be 25 watts at 1.5 kv.

Although the solid propellant electric rocket shown in the drawing uses a simple conical expansion cone, it will be appreciated by those skilled in the art that the principles of the present invention embrace expansion cones of more sophisticated geometry which might be employed in order to improve the performance of the rocket.

Although it is expected that periodic operation of the solid propellant electric rocket of the present invention will be entirely satisfactory for most application, it may be desirable, under certain circumstances, to operate the present electric rocket in an aperiodic fashion in order to avoid exciting natural mechanical resonances in the structure.

What is claimed is:
1. An electric rocket comprising:
 a source of electrical energy;
 a pair of spaced apart electrodes extending rearward in the direction of the axis of thrust of the rocket, at least one of said electrodes being connected to said energy source; and
 a solid body of polymerized fluorocarbon disposed between the forward ends of said electrodes so that, upon the discharge of electrical energy between said electrodes, the fluorocarbon will be depolymerized, converted into a plasma and magnetohydrodynamically accelerated to produce thrust.

2. The electric rocket of claim 1, wherein said electrodes are disposed in coaxial spaced relation.

3. The electric rocket of claim 2 wherein said solid body of polymerized fluorocarbon is in the form of a cylindrical solid having a diameter which fits within the outer cylindrical electrode, and having an opening along its axis to accommodate the inner electrode.

4. The electric rocket of claim 3 wherein said source of electrical energy comprises:
 a capacitor for storing electrical charge,
 means for charging said capacitor, and
 meansf or discharging said capacitor across said electrodes.

5. An electric rocket comprising:
 a first electrode disposed along the central axis of said rocket;
 a solid body of polymerized fluorocarbon surrounding said first electrode;
 a second electrode in the form of a cylinder disposed in coaxial relation with said first electrode and flared outward at one end to form the rocket nozzle;
 an electric energy storage device;
 means for discharging said energy storage device across said first and second electrodes so as to depolymerize the fluorocarbon, convert the resulting vapor into a plasma and magnetohydrodynamically accelerate the plasma to produce thrust; and
 a surface igniter plug mounted on said second electrode adjacent the operative end of said body of polymerized fluorocarbon for supplying ions to initiate the discharge between said first and second electrodes.

6. The electric rocket of claim 5 further comprising:
 stop means located adjacent the outwardly flared portion of said second electrode for contacting a narrow edge portion of the operative end surface of said body of polymerized fluorocarbon, and
 means for urging said body of polymerized fluorocarbon into contact with said stop means so as to maintain said body of polymerized fluorocarbon in the proper operative position.

7. The electric rocket of claim 6 wherein said stop means comprises an enlarged portion at the end of said first electrode adjacent the outwardly flared portion of said second electrode.

8. The electric rocket of claim 7 wherein said means for urging said body of polymerized fluorocarbon against said stop means comprises a spring.

9. A solid propellant electric rocket comprising:
 an electrical energy storage device;
 a pair of spaced apart electrodes extending rearwardly in the direction of the axis of thrust of the rocket, at least one of said electrodes being connected to said electrical energy storage device;
 a solid body of polymerized fluorocarbon propellant, the rearward surface of said body of polymerized fluorocarbon propellant being disposed between the forward ends of said pair of spaced apart electrodes;
 means for supplying a quantity of ions to initiate an electrical discharge between said pair of spaced apart electrodes; and
 means for discharging said electrical energy storage device across said pair of spaced apart electrodes so as to heat the rearward face of said body of fluorocarbon propellant and vaporize a portion thereof and to further heat and partially ionize the propellant vapor to produce a plasma which is accelerated rearwardly by a combination of aerothermodynamic and magnetohydrodynamic effects to provide thrust.

10. A solid propellant electric rocket comprising:
 a supporting structure;
 an electrical energy storage device mounted on said supporting structure;
 a pair of spaced apart electrodes mounted on said supporting structure and extending rearwardly in the direction of the axis of thrust of the rocket, at least one of said electrodes being connected to said electrical energy storage device;
 a solid body of polymerized fluorocarbon propellant mounted on said supporting structure, the rearward surface of said body of polymerized fluorocarbon propellant being disposed between the forward ends of said pair of spaced apart electrodes;
 means for discharging said electrical energy storage device across said pair of spaced apart electrodes so as to heat the rearward face of said body of fluorocarbon propellant and vaporize a portion thereof and to further heat and partially ionize the propellant vapor to produce a plasma which is accelerated rearwardly by a combination of aerothermodynamic and magnetohydrodynamic effects to provide thrust; and
 a nozzle mounted on said supporting structure and extending rearwardly from said rearward surface of said body of fluorocarbon propellant to direct the plasma rearwardly along the axis of thrust of the rocket.

References Cited

UNITED STATES PATENTS

| | | | |
|---|---|---|---|
| 2,394,581 | 2/1946 | Benning et al. | 260—92.1 |
| 3,270,498 | 9/1966 | La Rocca | 60—202 |
| 3,358,452 | 12/1967 | Ehrenfeld et al. | 60—200 |

SAMUEL FEINBERG, Primary Examiner

U.S. Cl. X.R.

60—203